United States Patent
Matsunaga et al.

(10) Patent No.: US 12,531,451 B2
(45) Date of Patent: Jan. 20, 2026

(54) OUTER ROTOR MOTOR WITH ROTOR ATTACHMENT MEMBER

(71) Applicant: HONDA MOTOR CO., LTD., Tokyo (JP)

(72) Inventors: Naoki Matsunaga, Wako (JP); Hiroshi Mizuguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 262 days.

(21) Appl. No.: 17/485,954

(22) Filed: Sep. 27, 2021

(65) Prior Publication Data

US 2022/0014061 A1 Jan. 13, 2022

Related U.S. Application Data

(63) Continuation of application No. PCT/JP2019/014323, filed on Mar. 29, 2019.

(51) Int. Cl.
  *H02K 9/06* (2006.01)
  *H02K 1/2786* (2022.01)
  *H02K 1/30* (2006.01)
  *H02K 21/22* (2006.01)

(52) U.S. Cl.
  CPC ............. *H02K 1/30* (2013.01); *H02K 1/2786* (2013.01); *H02K 9/06* (2013.01); *H02K 21/22* (2013.01)

(58) Field of Classification Search
  CPC ........ H02K 1/30; H02K 1/2786; H02K 1/187; H02K 9/06; H02K 21/22; H02K 5/1735; H02K 7/085

USPC ................... 310/61–62, 67 R, 156.26, 261.1
See application file for complete search history.

(56) References Cited

U.S. PATENT DOCUMENTS

| | | | | |
|---|---|---|---|---|
| 6,384,494 | B1* | 5/2002 | Avidano | F04D 25/0613 310/58 |
| 6,573,629 | B1* | 6/2003 | Morimatsu | H02K 21/222 310/180 |
| 2006/0250034 | A1 | 11/2006 | Umezu | |

(Continued)

FOREIGN PATENT DOCUMENTS

| CN | 201290032 Y | 8/2009 |
|---|---|---|
| CN | 205792124 U | 12/2016 |

(Continued)

OTHER PUBLICATIONS

Machine translation of JP-2013150441-A. (Year: 2013).*

(Continued)

*Primary Examiner* — Michael Andrews
(74) *Attorney, Agent, or Firm* — WHDA, LLP (57) ABSTRACT

An outer rotor type motor includes a rotor in which magnets are arranged on an inner circumferential surface of a cylindrical rotor yoke. The outer rotor type motor comprises: a motor shaft configured to rotatably support the rotor; and a rotor attachment member including a base end extended from an outer periphery of the motor shaft outward in a radial direction and an outer end formed from an outer periphery of the base end outward in the radial direction, wherein the outer end is formed at a position close to the inner circumferential surface of the rotor yoke, as compared with an outer peripheral surface of the motor shaft, and the rotor is attached to the outer end.

15 Claims, 8 Drawing Sheets

(56) References Cited

U.S. PATENT DOCUMENTS

| | | | | |
|---|---|---|---|---|
| 2010/0176603 A1* | 7/2010 | Bushnell | ......... | H02K 9/06 |
| | | | | 310/63 |
| 2012/0085132 A1* | 4/2012 | Kim | ......... | H02K 5/1735 |
| | | | | 68/140 |
| 2016/0087510 A1* | 3/2016 | Endo | ......... | A01D 34/6812 |
| | | | | 310/62 |
| 2017/0149308 A1* | 5/2017 | Sayre | ......... | H02K 5/207 |

FOREIGN PATENT DOCUMENTS

| | | | |
|---|---|---|---|
| DE | 19513134 A1 | | 10/1996 |
| DE | 10 2016 203 892 A1 | | 9/2017 |
| JP | 11-098795 A | | 4/1999 |
| JP | 2000-175396 A | | 6/2000 |
| JP | 2000217321 A | * | 8/2000 |
| JP | 2001-112226 A | | 4/2001 |
| JP | 2002-084728 A | | 3/2002 |
| JP | 2002-263576 A | | 9/2002 |
| JP | 2012-244704 A | | 12/2012 |
| JP | 2013150441 A | * | 8/2013 |
| JP | 5931460 B2 | | 6/2016 |
| WO | 2020/255730 A1 | | 12/2020 |

OTHER PUBLICATIONS

Machine translation of JP-2000217321-A. (Year: 2000).*
International Search Report dated Jun. 25, 2019, issued in counterpart application No. PCT/JP2019/014323, w/English translation (4 pages).
Written Opinion dated Jun. 25, 2019, issued in counterpart application No. PCT/JP2019/014323 (5 pages).
Office Action dated Feb. 13, 2023, issued in counterpart EP Application No. 19922672.1. (10 pages).
Office Action dated Mar. 13, 2023, issued in counterpart JP Application No. 2021-511764, with English Translation. (8 pages).
Extended (Supplementary) European Search Report dated Mar. 9, 2022, issued in counterpart EP application No. 19922672.1. (13 pages).
Office Action dated Nov. 18, 2024, issued in counterpart CN Application No. 201980094499.8, with English translation. (18 pages).
Office Action dated Jan. 6, 2025, issued in counterpart Japanese patent application No. 2023181125 with English translation (12 pages).

* cited by examiner

ENLARGED VIEW OF A PORTION

OUTER ROTOR MOTOR WITH ROTOR ATTACHMENT MEMBER

CROSS-REFERENCE TO RELATED APPLICATION(S)

This application is a continuation of International Patent Application No. PCT/JP2019/014323 filed on Mar. 29, 2019, the entire disclosures of which are incorporated herein by reference.

BACKGROUND OF THE INVENTION

Field of the Invention

The present invention relates to an outer rotor type motor.

Background Art

PTL 1 discloses an outer rotor type motor having a structure in which a rotor main body 31 is attached to a flange portion 43 integrally formed near a motor shaft 40 and an inner fan 70 is also integrally attached on the upper surface of a bottom portion 33 of the rotor main body 31.

CITATION LIST

Patent Literature

PTL 1: Japanese Patent No. 5931460

SUMMARY OF THE INVENTION

Technical Problem

The structure disclosed in PTL 1, however, has a problem that the centrifugal force (load) by a magnet 35 provided on the outer end side (the inner side of a tubular portion) of the rotor main body 31 acts on the flange portion 43 formed near the motor shaft, and thus the reliability in strength of the flange portion 43 may lower.

The present invention has as its object to provide an outer rotor type motor excellent in strength reliability.

Solution to Problem

An outer rotor type motor according to one aspect of the present invention is an outer rotor type motor including a rotor in which magnets are arranged on an inner circumferential surface of a cylindrical rotor yoke, comprising:
a motor shaft configured to rotatably support the rotor; and
a rotor attachment member including a base end extended from an outer periphery of the motor shaft outward in a radial direction and an outer end formed from an outer periphery of the base end outward in the radial direction,
wherein the outer end is formed at a position close to the inner circumferential surface of the rotor yoke, as compared with an outer peripheral surface of the motor shaft, and the rotor is attached to the outer end.

Advantageous Effects of Invention

According to the present invention, it is possible to reduce the influence of the centrifugal force (load) that can be generated by the rotation of a rotor by forming an outer end attached with the rotor at a position close to the inner circumferential surface of a rotor yoke, as compared with the outer peripheral surface of the motor shaft, thereby providing an outer rotor type motor excellent in strength reliability.

Other features and advantages of the present invention will be apparent from the following descriptions taken in conjunction with the accompanying drawings, in which like reference characters designate the same or similar parts throughout the figures thereof.

DESCRIPTION OF EMBODIMENTS

Embodiments of the present invention will be described below with reference to the accompanying drawings. The constituent elements described in the embodiments are merely examples and are not limited by the following embodiments.

First Embodiment (Arrangement of Outer Rotor Type Motor)

Figure 1:
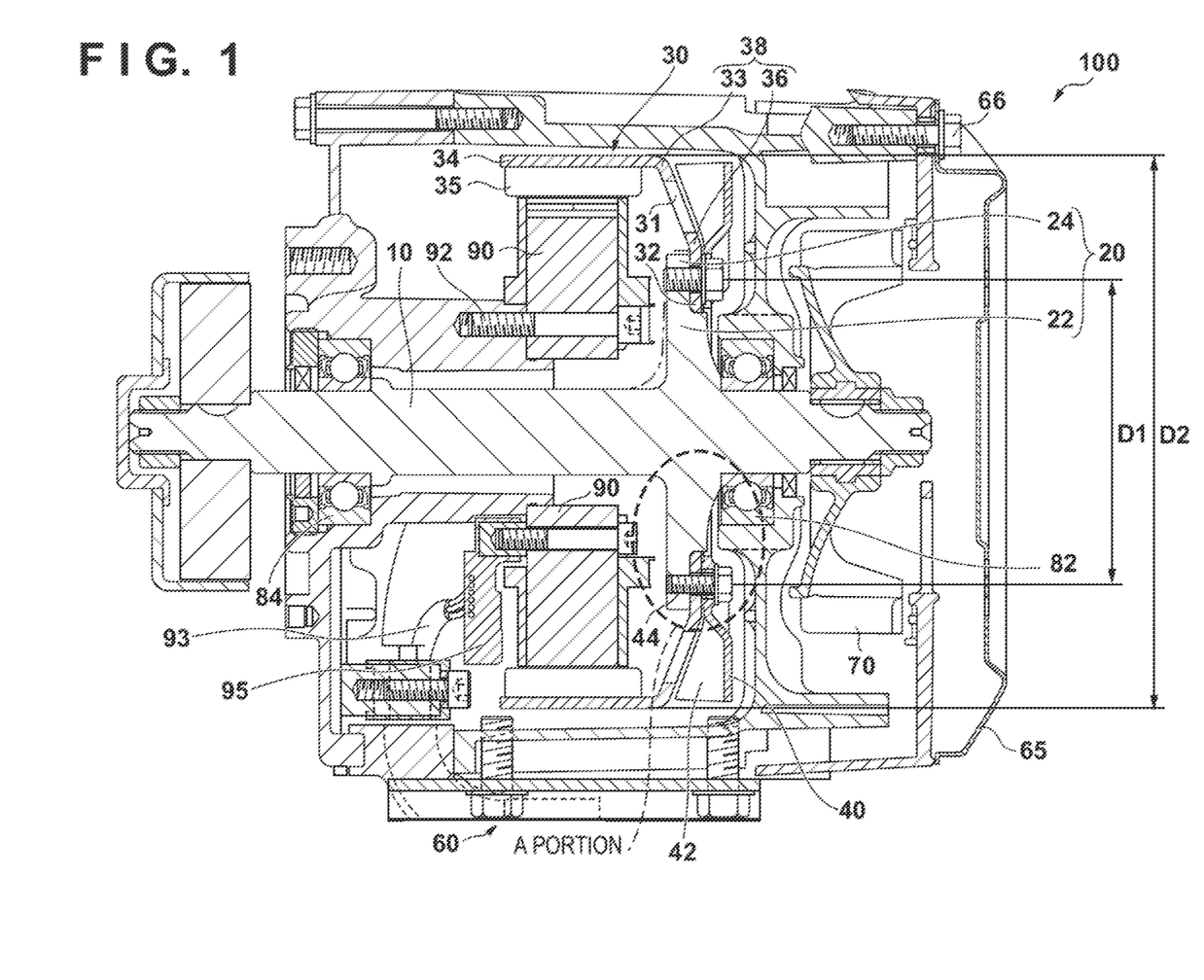
FIG. 1 is a sectional view showing the arrangement of an outer rotor type motor according to the first embodiment.

FIG. 1 is a sectional view showing the arrangement of an outer rotor type motor according to the first embodiment. As shown in FIG. 1, an outer rotor type motor 100 is an outer rotor type motor including a rotor 30 in which a plurality of magnets 35 are arranged on the inner circumferential surface of a cylindrical rotor yoke 31. A motor shaft 10 is rotatably supported by bearings 82 and 84 provided in a motor housing 60. The plurality of magnets 35 arranged on the inner circumferential surface of the rotor yoke 31 are arranged to alternately form different magnetic poles in the circumferential direction.

In this embodiment, a rotor attachment member 20 is formed integrally with the motor shaft 10. The rotor attachment member 20 includes a base end 22 extended from the outer periphery of the motor shaft 10 outward in a radial direction, and an outer end 24 formed from the outer periphery of the base end outward in the radial direction.

When a distance from the center of the motor shaft 10 to the central portion (yoke attachment members 37 to be described later) of the outer end 24 in the radial direction is set as the first distance (=D1/2=R1), and a distance from the center of the motor shaft 10 to the outer peripheral portion of the rotor yoke 31 is set as the second distance (=D2/2=R2), the outer end 24 is formed at a position where a relation of the first distance (R1)>0.5× the second distance (R2) is satisfied.

That is, the outer end 24 (yoke attachment members 37) of the rotor attachment member 20 is formed at a position (first distance (R1)>0.5× second distance (R2)) close to the inner circumferential surface of the rotor yoke 31, as compared with the outer peripheral surface (tubular portion 34) of the motor shaft 10, and the rotor 30 is attached to the outer end 24. The motor shaft 10 rotatably supports the rotor 30, and the rotor 30 attached to the outer end 24 is rotated by the rotation of the motor shaft 10.

By forming the outer end 24 attached with the rotor 30 at a position close to the inner circumferential surface (tubular portion 34) of the cylindrical rotor yoke 31, as compared with the outer peripheral surface of the motor shaft 10, it is possible to reduce the influence of the centrifugal force (load) that can be generated by the rotation of the rotor, thereby providing the outer rotor type motor excellent in strength reliability.

(Detailed Structure of Rotor Attachment Member 20)

Figure 2:
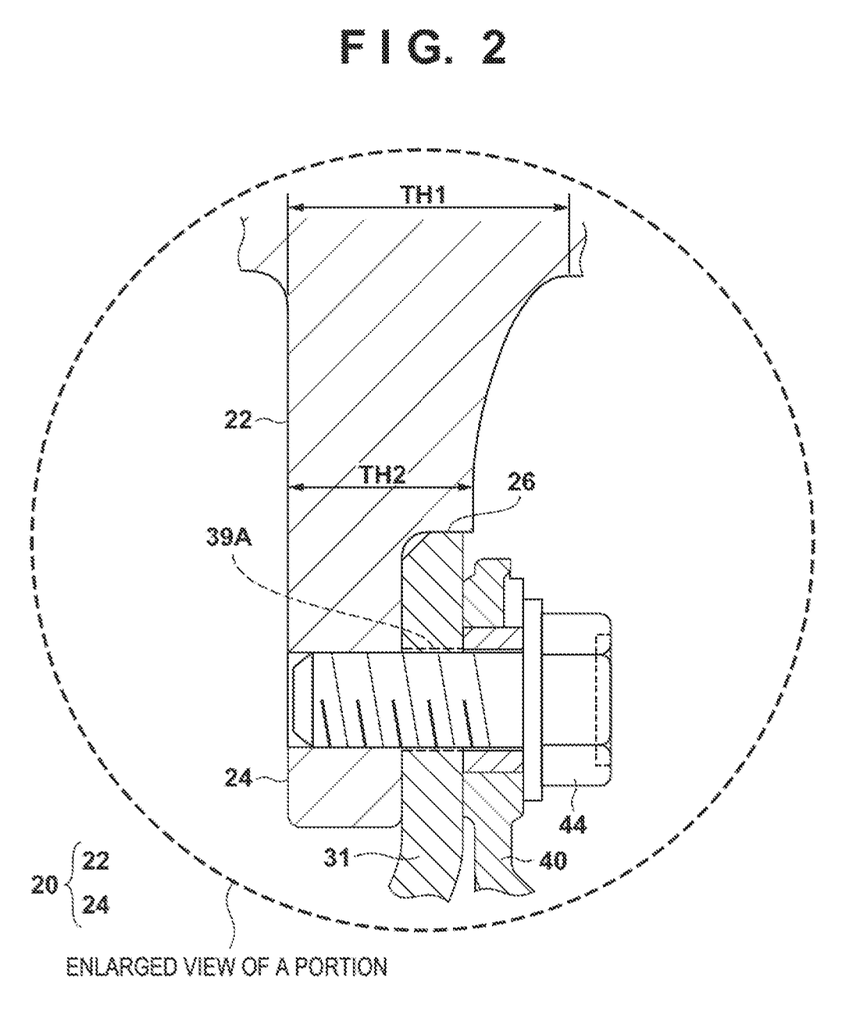
FIG. 2 is an enlarged view showing the structure of a rotor attachment member.

FIG. 2 is an enlarged view of the structure of the rotor attachment member 20 shown in an A portion in FIG. 1. The member thickness (thickness) of the base end 22 on the side of the motor shaft 10 is represented by TH1, and the member thickness (thickness) of the base end 22 on the side of the outer end 24 extending outward in the radial direction is represented by TH2. The base end 22 is formed so that the thickness in the axial direction of the motor shaft 10 (to be simply referred to as an axial direction hereinafter) gradually decreases from the outer periphery of the motor shaft 10 to the outer end 24 that is radially outside. It is possible to distribute stress concentration that can locally occur in a portion on the fixed end side (a portion on the side of the motor shaft 10) of the base end 22 by the rotation of the rotor 30 while ensuring rigidity of a portion as a base of the outer end 24 to which the rotor is attached.

By forming the outer end 24 outward in the radial direction from the outer periphery of the base end 22 formed so that the rigidity is ensured and stress concentration is prevented, it is possible to form the outer end 24 at a position close to the inner circumferential surface (tubular portion 34) of the cylindrical rotor yoke 31, as compared with the outer peripheral surface of the motor shaft 10. This can reduce the influence of the centrifugal force (load) that can be generated by the rotation of the rotor 30, thereby providing the outer rotor type motor excellent in strength reliability.

As shown in FIG. 2, a step 26 having a different thickness is formed between the base end 22 and the outer end 24 along the axial direction of the motor shaft 10. The rotor 30 is attached to the outer end 24 by the yoke attachment members 37 (for example, bolts) in a state in which the opening of the rotor yoke 31 is fitted in the step 26. By faucet joining using the step 26, positioning of the rotor 30 (rotor yoke 31) and the rotor attachment member 20 becomes easy, thereby making it possible to reduce an error of the shaft center at the time of assembly. In addition, since faucet joining can increase the contact area of the rotor yoke 31 and the outer end 24 and base end 22 of the rotor attachment member 20, the load acting on the outer end 24 while the rotor 30 is attached can be distributed toward the base end 22.

(Structure of Rotor Yoke 31)

Referring back to FIG. 1, the sectional structure of the rotor yoke 31 will be described. The cylindrical rotor yoke 31 includes a connecting portion 32 formed to overlap the outer end 24, the tubular portion 34 formed so as to arrange the magnets 35 on the inner circumferential surface, and a joint portion 38 that joins the connecting portion 32 and the tubular portion 34 via a plurality of bending portions formed between the connecting portion 32 and the tubular portion 34.

A portion, contacting the connecting portion 32, of the outer end 24 of the rotor attachment member 20 is formed in a planar shape in a direction (to also be referred to as a vertical direction hereinafter) intersecting the axial direction of the motor shaft 10, and the connecting portion 32 of the rotor yoke 31 is formed along the vertical direction in a planar shape to overlap the outer end 24. The tubular portion 34 of the rotor yoke 31 is formed in a cylindrical shape, and arranged so that the plurality of magnets 35 with different magnet poles formed alternately in the circumferential direction can be arranged.

In the example shown in FIG. 1, a plurality of bending portions 33 and 36 are formed between the connecting portion 32 and the tubular portion 34, and the joint portion 38 is formed to join the connecting portion 32 and the tubular portion 34 via the plurality of bending portions 33 and 36. The joint portion 38 that includes the two bending portions 33 and 36 as the plurality of bending portions is exemplified. However, an example of the arrangement of the bending portions is not limited to this, and two or more bending portions can be formed.

The bending portion 36 (to also be referred to as the "first bending portion" hereinafter) is formed to bend the joint portion 38 toward the tubular portion 34 at a predetermined first angle (obtuse angle) between the connecting portion 32 formed in the vertical direction with respect to the axial direction of the motor shaft 10 and the tubular portion 34 formed along the axial direction of the motor shaft 10 (formed almost in parallel to the axial direction of the motor shaft 10).

The bending portion 33 (to also be referred to as the "second bending portion" hereinafter) is formed to bend, at a predetermined second angle (obtuse angle), the joint portion 38 bending at the first angle (obtuse angle) by the bending portion 36 (first bending portion) to be joined to the tubular portion 34.

In the bending portions 36 and 33, the first and second angles are both obtuse angles, and can be set based on the shape design (the structure of the connecting portion 32, the tubular portion 34, and the like) of the rotor yoke 31. That is, based on the structure of the connecting portion 32, the tubular portion 34, and the like, the first and second angles of the joint portion 38 can be set to the same angle, set so that the first angle is larger than the second angle, or set so that the first angle is smaller than the second angle. By connecting the connecting portion 32 and the tubular portion 34 by the joint portion 38, the rotor yoke 31 is formed in such cylindrical shape that one opening of the tubular portion 34 is partially sealed.

Referring to FIG. 1, a stator 90 includes a stator core including a core main body in an almost annular shape, and a plurality of coils wounded around the stator core, and is fixed to the inside of the motor housing 60 by a stator fastening member 92. In the state in which the stator 90 is fixed to the inside of the motor housing 60, the stator 90 and the magnets 35 arranged on the inner circumferential surface of the tubular portion 34 face each other.

The coils of the stator 90 are supplied with a driving current from an external motor control apparatus (not shown) via a cable 93 and an electrical connection portion 95, and the rotor 30 is rotated by a magnetic field generated by the driving current. Rotation information of the motor shaft 10 detected by a rotation detection element (not shown) is configured to be transmittable to an external control apparatus.

(Attachment Structure of Rotor Yoke 31)

Figure 7:
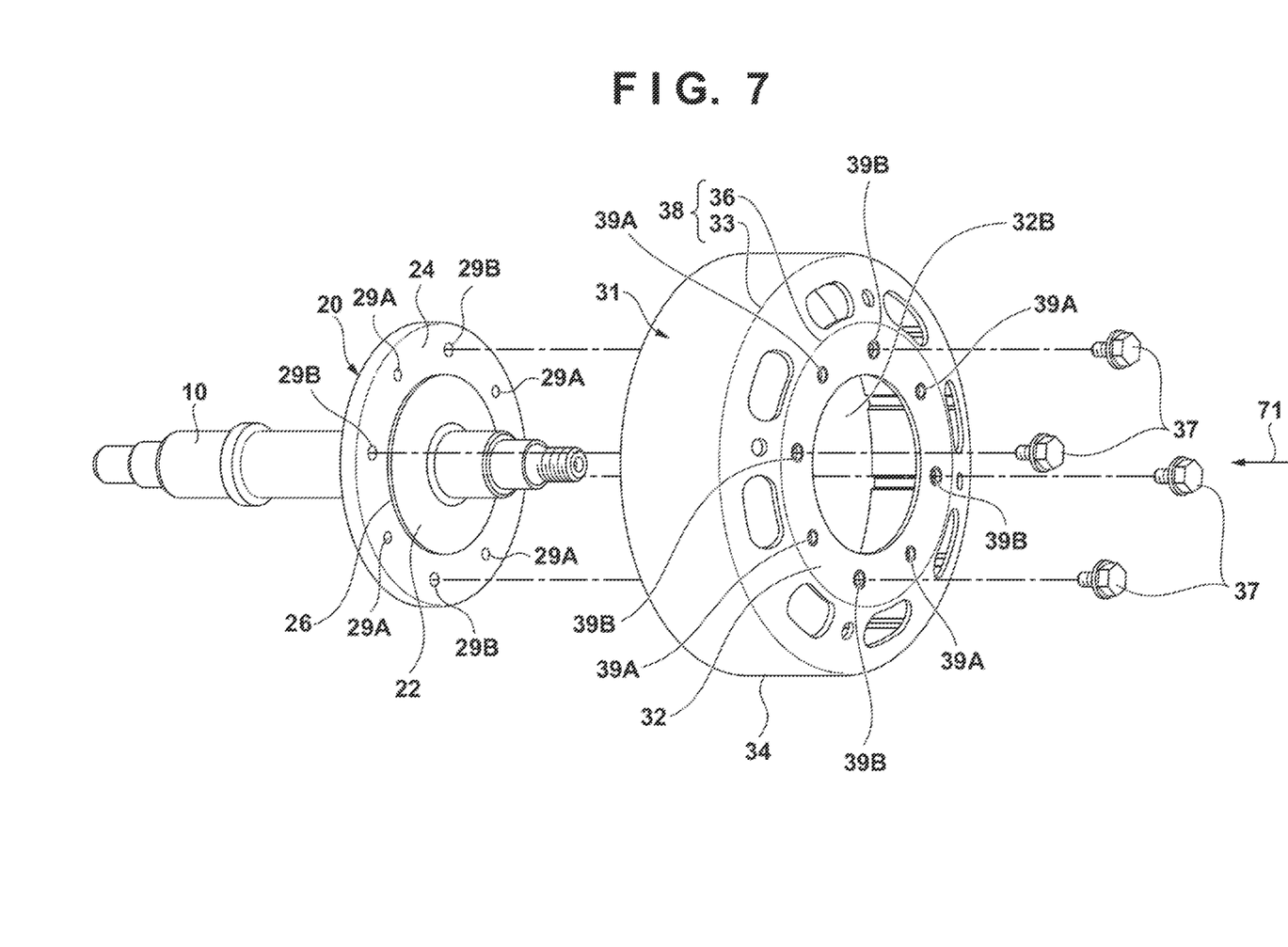
FIG. 7 is a view schematically showing a state in which a rotor yoke is attached to the outer end.

FIG. 7 is a view schematically showing a state in which the rotor yoke 31 is attached to the outer end 24 of the rotor attachment member 20. In the rotor yoke 31, through holes 39B through which the yoke attachment members 37 (for example, bolts) pass are formed. Each of the through holes 39B is formed to have a hole diameter larger than the diameter (screw diameter) of the yoke attachment member 37. The yoke attachment members 37 are engaged with first engaging portions 29B (screw holes) formed in the outer end 24 to attach the rotor yoke 31 to the outer end 24.

Figure 8:
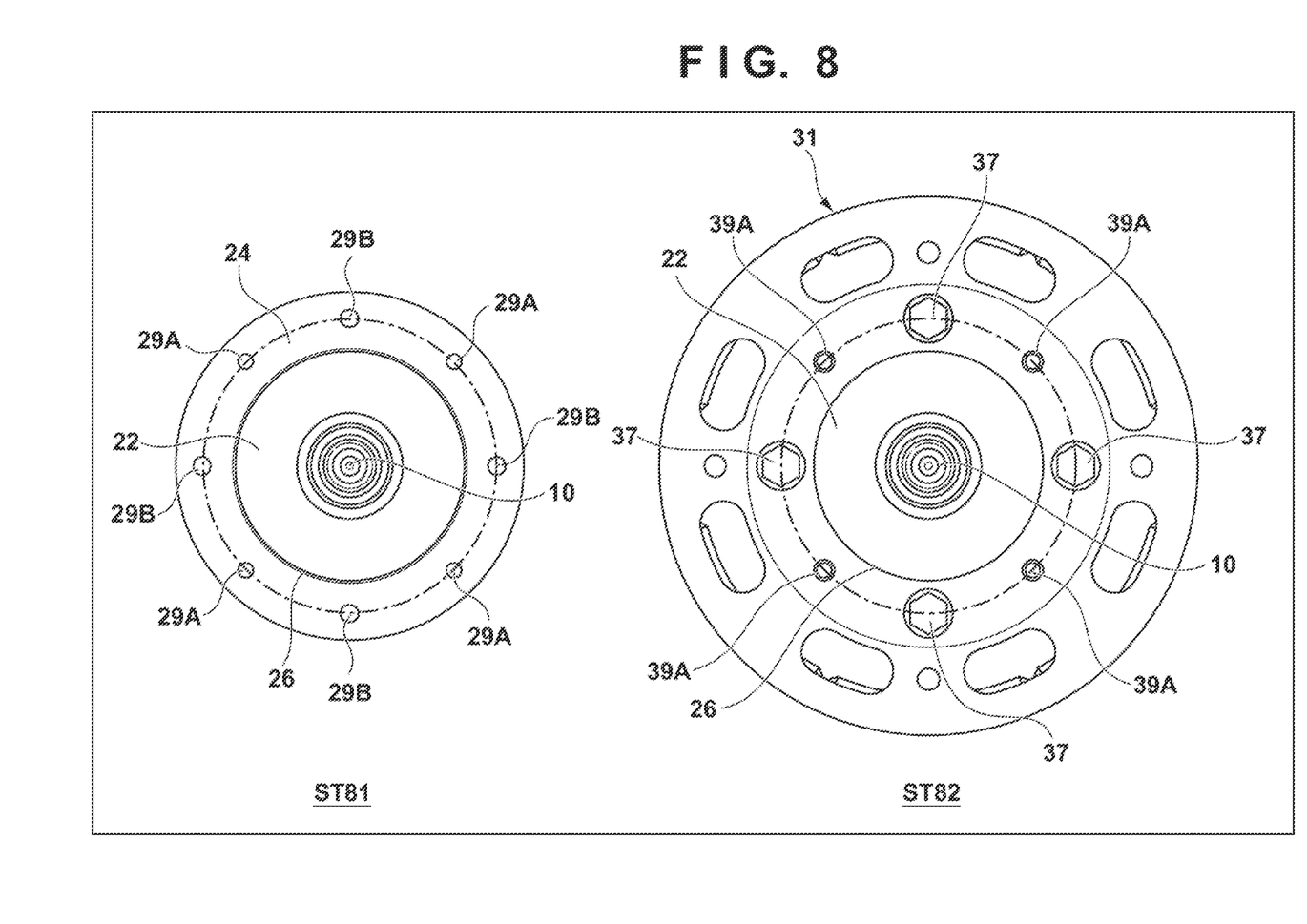
FIG. 8 is a view for explaining attachment of the rotor yoke.

In FIG. 8, ST81 shows a state in which the rotor attachment member 20 (base end 22 and outer end 24) formed in the motor shaft 10 is viewed from a direction of an arrow 71 in FIG. 7. In the outer end 24, the first engaging portions 29B (screw holes) that can be engaged with the yoke attachment members 37 for attaching the rotor yoke 31 (rotor 30) and second engaging portions 29A (screw holes) that can be engaged with fan attachment members 44 for attaching a fan 40 are concentrically formed.

By concentrically attaching the rotor yoke 31 and the fan 40 to the outer end 24 of the rotor attachment member 20, that is, attaching the rotor yoke 37 and the fan 40 using the outer end 24 formed in a planar and annular shape, it is unnecessary to additionally provide, in the outer end 24, a fan attachment portion as a structure for attaching the fan 40, thereby making it possible to decrease the size of the outer end 24 (the dimension of the outer end 24 in the radial direction).

In FIG. 8, ST82 shows a state in which a state of attaching the rotor yoke 31 to the outer end 24 is viewed from the direction of the arrow 71 in FIG. 7. An opening 32B is formed at the center of the rotor yoke 31, and the rotor yoke 31 (rotor 30) is attached to the outer end 24 in a state in which the step 26 (FIG. 2) is fitted in the opening 32B. In ST82 of FIG. 8, through holes 39A are formed so that the fan attachment members 44 for attaching the fan 40 to the outer end 24 pass through the rotor yoke 31. In the rotor yoke 31, the through holes 39B (FIG. 7) through which the yoke attachment members 37 pass and the through holes 39A through which the fan attachment members 44 pass are concentrically formed. Similar to the through holes 39B, each of the through holes 39A is formed to have a hole diameter larger than the diameter (screw diameter) of the fan attachment member 44.

(Structure of Cooling Fan)

The outer rotor type motor 100 includes a fan 70 (external fan) and the fan 40 (internal fan) as a cooling mechanism using the rotation driving force of the motor.

The fan 70 (external fan) is attached to the motor shaft 10 by a fastening member such as a key. The fan 40 (internal fan) is formed concentrically with the rotor yoke 31. In a state in which the rotor yoke 31 is attached between the fan 40 and the outer end 24, the fan 40 is attached to the outer end 24. The fan 40 is attached to the outer end 24 by the fan attachment members 44 such as bolts.

On the side of the outer rotor type motor 100, a motor cover 65 is attached to the motor housing 60 by a cover fastening member 66 (for example, a bolt or the like), and the fan 70 (external fan) is covered with the motor cover 65.

When the fan 40 (internal fan) and the fan 70 (external fan) turn by the rotation of the motor shaft 10, the fan 40 (internal fan) circulates air in the outer rotor type motor 100, thereby cooling the rotor 30, the stator 90, and the like.

Furthermore, the fan 70 (external fan) sends, toward the outer wall (motor housing 60) of the outer rotor type motor 100, air taken from an intake opening (not shown) formed in the motor cover 65, thereby cooling the outer wall of the outer rotor type motor 100. Air (external cooling air) sent by the fan 70 (external fan) cools the outer wall of the motor 100, and also encourages heat exchange between the outer wall and internally circulating air by the fan 40 (internal fan).

(Attachment Structure of Cooling Fan)

Figure 5:
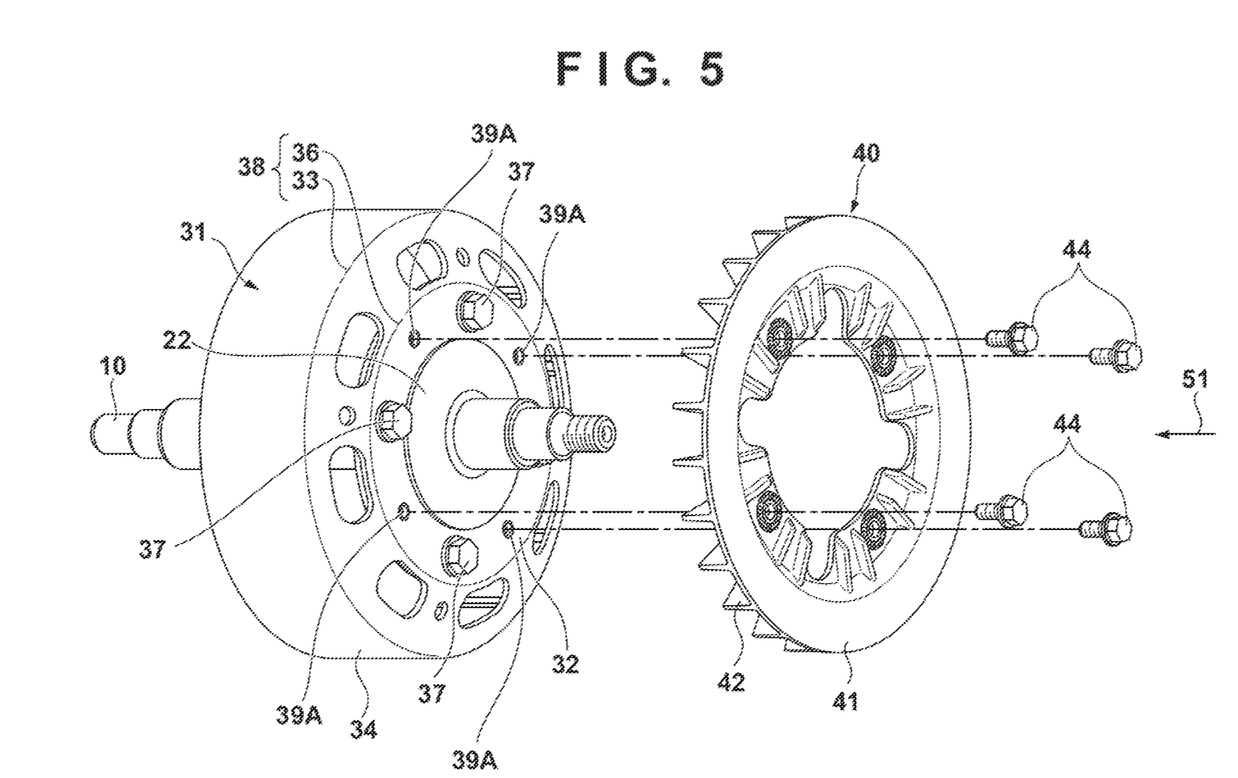
FIG. 5 is a view schematically showing a state in which a fan is attached to an outer end.

FIG. 5 is a view schematically showing a state in which the fan 40 is attached to the outer end 24 of the rotor attachment member 20. In the rotor yoke 31 arranged between the outer end 24 and the fan 40, the through holes 39A through which the fan attachment members 44 (for example, bolts) pass are formed. The fan 40 is attached to the outer end 24 when the fan attachment members 44 are engaged with the second engaging portions 29A (screw holes: FIG. 8) formed in the outer end 24.

Figure 6:
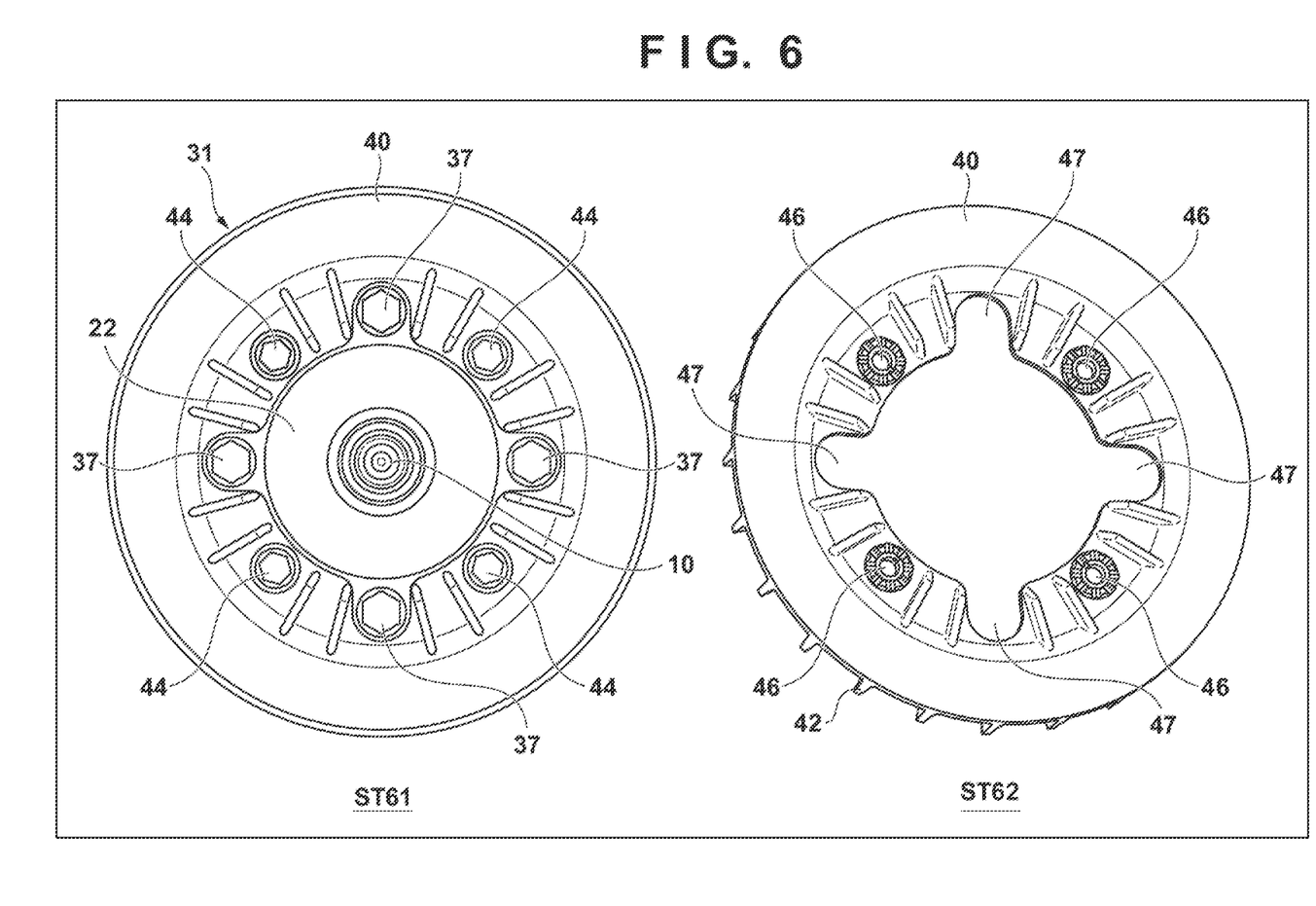
FIG. 6 is a view for explaining attachment of the fan.

In FIG. 6, ST61 shows a state in which the fan 40 attached to the outer end 24 is viewed from a direction of an arrow 51 in FIG. 5. In FIG. 6, ST62 shows a state in which only the fan 40 is viewed from the direction of the arrow 51 in FIG. 5. Through holes 46 through which the fan attachment members 44 pass are formed in the fan 40. Similar to the through holes 39A, each of the through holes 46 is formed to have a hole diameter larger than the diameter (screw diameter) of the fan attachment member 44. In addition, notch portions 47 are formed to be larger than the outer diameters of the yoke attachment members 37 in the fan 40 so as not to abut against the yoke attachment members 37 for attaching the rotor yoke 31 to the outer end 24.

As shown in ST61 of FIG. 6, in a state in which the rotor yoke 31 is attached to the outer end 24 by the yoke attachment members 37, the fan 40 is also attached to the outer end 24 by the fan attachment members 44. In the state in which the fan 40 is attached to the outer end 24, the notch portions 47 prevent the yoke attachment members 37 and the fan 40 from abutting against each other.

Since the yoke attachment members 37 and the fan 40 do not abut against each other, if the fan attachment members 44 are removed in the state in which the rotor yoke 31 is attached, only the fan 40 can be detached from the outer end 24. That is, while maintaining the state in which the rotor yoke 31 (rotor 30) is attached to the outer end 24 of the rotor attachment member 20, it is possible to detach only the fan 40 from the outer end 24 of the rotor attachment member 20. This can improve the maintainability of the outer rotor type motor.

As shown in FIG. 5, the fan 40 includes a fan main body 41 and a plurality of blade portions 42 arranged in the circumferential direction. In the state in which the fan 40 is attached to the outer end 24, the blade portions 42 of the fan 40 are arranged in a space formed between the fan main body 41 and the joint portion 38 bending by the plurality of bending portions 33 and 36.

For example, if no bending portions are provided in the joint portion 38 and the connecting portion 32 is extended linearly in the vertical direction, the space between the joint portion and the fan main body 41 is small, and the sizes of the blade portions of the fan are limited. If each blade portion is formed in a size equal to that of the blade portion 42 shown in FIG. 1, the attachment position of the fan 40 shifts in the right direction on the drawing surface of FIG. 1 along the axial direction of the motor shaft 10, and the cooling mechanism increases in size.

By arranging the blade portions 42 in the space formed when the joint portion 38 bends by the plurality of bending portions 33 and 36, the outer rotor type motor 100 with the cooling mechanism using the rotation driving force of the motor can further be decreased in size. In addition, when the joint portion 38 bends by the plurality of bending portions 33 and 36, the space where the blade portions 42 can be arranged can be enlarged, as shown in FIG. 1, and it is possible to decrease the size, and also cool the outer rotor type motor 100 using the fan 40 with a larger area of the blade portions 42 and improved cooling performance.

Second Embodiment

Figure 3:
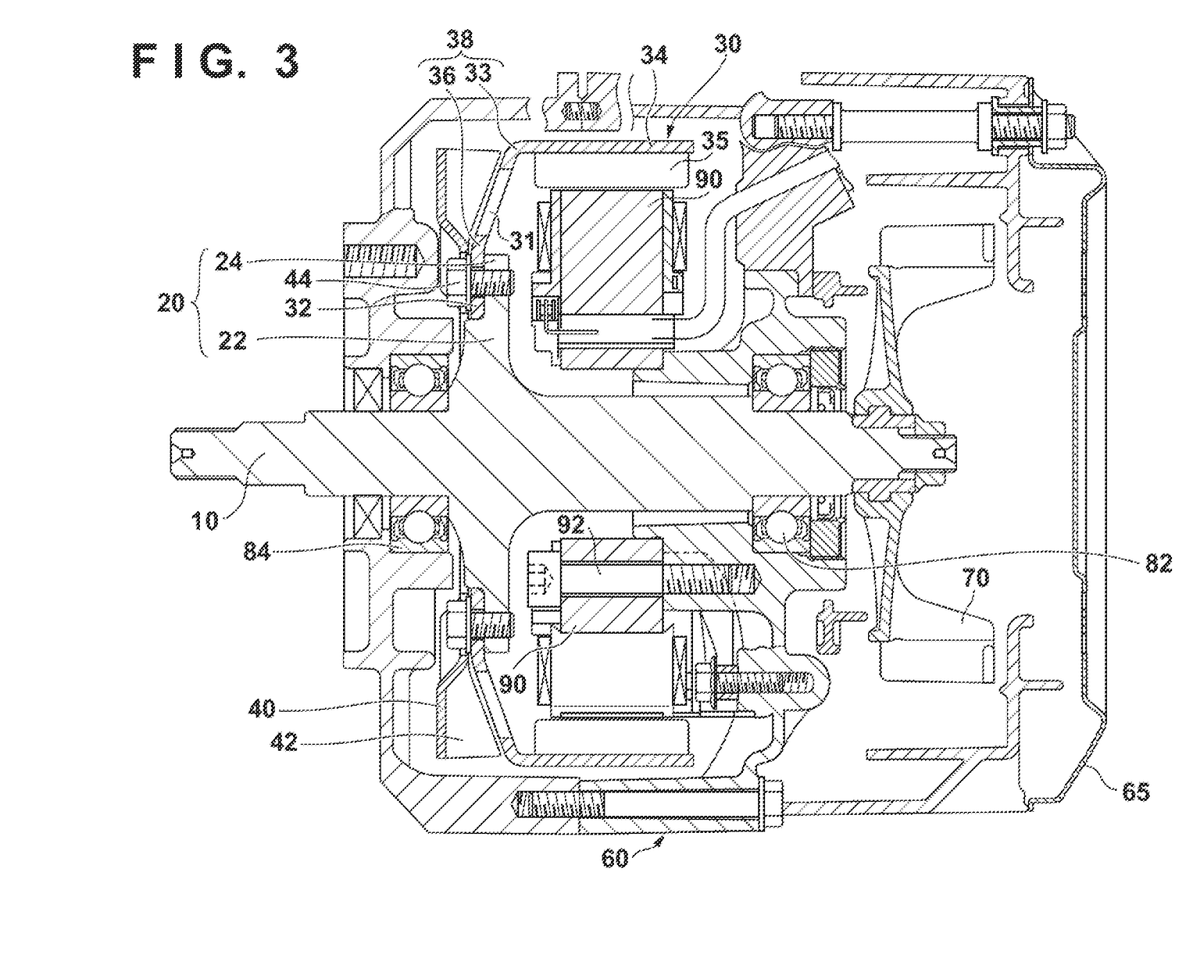
FIG. 3 is a sectional view showing the arrangement of an outer rotor type motor according to the second embodiment.

FIG. 3 is a sectional view showing the arrangement of an outer rotor type motor 100 according to the second embodiment. The first embodiment has explained an example in which the fan 70 (external fan) and the fan 40 (internal fan) are arranged at one end of the motor shaft 10 as the cooling mechanism of the outer rotor type motor 100. The present invention, however, is not limited to this. As shown in FIG. 3, a fan 70 (external fan) can be arranged at one end of a motor shaft 10 and a fan 40 (internal fan) can be arranged at the other end of the motor shaft 10. In this case, the arrangement direction of a rotor attachment member 20 and a rotor 30 is opposite to that in FIG. 1. However, in this embodiment as well, it is possible to obtain the same effect as in the outer rotor type motor 100 according to the first embodiment.

Third Embodiment

Figure 4:
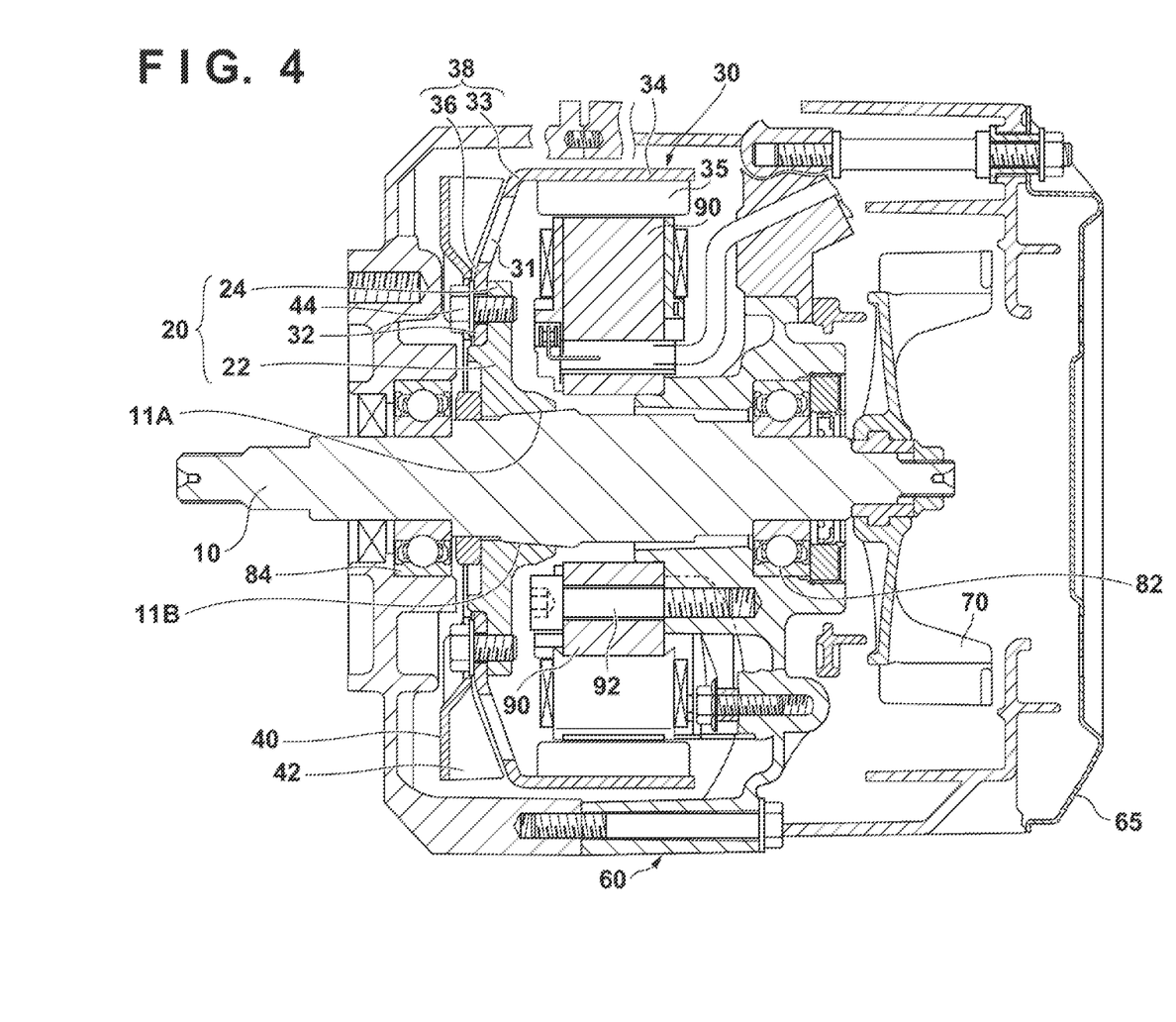
FIG. 4 is a sectional view showing the arrangement of an outer rotor type motor according to the third embodiment.

FIG. 4 is a sectional view showing the arrangement of an outer rotor type motor 100 according to the third embodiment. Each of the first and second embodiments has explained an example of the arrangement of the outer rotor type motor 100 in which the rotor attachment member 20 is integrally formed with the motor shaft 10 by, for example, casting or cutting. However, a rotor attachment member 20 and a motor shaft 10 can be formed as separate parts.

In this case, for example, as shown in FIG. 4, a tapered portion 11A is provided in the motor shaft 10, an engaging hole 11B that is engaged with the tapered portion 11A is formed on the side of the rotor attachment member 20, and the rotor attachment member 20 is positioned at a predetermined position on the motor shaft 10 by the tapered portion 11A and the engaging hole 11B.

In the example shown in FIG. 4, a fan 70 (external fan) is arranged at one end of the motor shaft 10 and a fan 40 (internal fan) is arranged at the other end of the motor shaft 10. However, as shown in FIG. 1, the fan 70 (external fan) and the fan 40 (internal fan) may be arranged at one end of the motor shaft 10. In this embodiment as well, it is possible to obtain the same effect as in the outer rotor type motor 100 according to the first embodiment.

Summary of Embodiments

Arrangement 1. An outer rotor type motor according to the above embodiment is an outer rotor type motor (for example, 100 in FIG. 1) including a rotor (for example, 30 in FIG. 1) in which magnets (for example, 35 in FIG. 1) are arranged on an inner circumferential surface of a cylindrical rotor yoke (for example, 31 in FIG. 1), comprising:
    a motor shaft (for example, 10 in FIG. 1) configured to rotatably support the rotor (30); and
    a rotor attachment member (for example, 20 in FIG. 1) including a base end (for example, 22 in FIG. 1) extended from an outer periphery of the motor shaft (10) outward in a radial direction and an outer end (for example, 24 in FIG. 1) formed from an outer periphery of the base end (22) outward in the radial direction,
    wherein the outer end (24) is formed at a position close to the inner circumferential surface of the rotor yoke (31), as compared with an outer peripheral surface of the motor shaft (10), and
    the rotor (10) is attached to the outer end (24).

In the outer rotor type motor according to arrangement 1, it is possible to reduce the influence of the centrifugal force (load) that can be generated by the rotation of the rotor 30 by forming the outer end 24 attached with the rotor 30 at a position close to the inner circumferential surface of the cylindrical rotor yoke 31, as compared with the outer peripheral surface of the motor shaft 10, thereby providing the outer rotor type motor excellent in strength reliability.

Arrangement 2. In the outer rotor type motor according to the above embodiment, the base end (22) is formed so that a thickness in an axial direction of the motor shaft (10) gradually decreases from the outer periphery of the motor shaft (10) to the outer end (24) that is radially outside.

In the outer rotor type motor according to arrangement 2, since the rotor attachment member 20 includes the base end 22 formed so that the thickness in the axial direction of the motor shaft gradually decreases toward the outer end that is radially outside, it is possible to distribute the load (stress concentration) that can locally occur in a portion on the fixed end side (a portion on the side of the motor shaft 10) of the base end 22 by the rotation of the rotor 30 while ensuring rigidity of a portion as a base of the outer end 24 to which the rotor 30 is attached.

By forming the outer end outward in the radial direction from the outer periphery of the base end formed so that the rigidity is ensured and stress concentration is prevented, it is possible to form the outer end at a position close to the inner circumferential surface of the cylindrical rotor yoke, as compared with the outer peripheral surface of the motor shaft. This can reduce the influence of the centrifugal force (load) that can be generated by the rotation of the rotor, thereby providing the outer rotor type motor excellent in strength reliability.

Arrangement 3. In the outer rotor type motor according to the above embodiment, a step (for example, 26 in FIG. 2) is formed between the base end and the outer end along the axial direction of the motor shaft, and
    the rotor (30) is attached to the outer end (24) in a state in which an opening of the rotor yoke (31) is fitted in the step (26).

In the outer rotor type motor according to arrangement 3, by faucet joining (mate fitting) using the step, positioning of the rotor 30 (rotor yoke 31) and the rotor attachment member 20 becomes easy, thereby making it possible to reduce an error of the shaft center at the time of assembly. In addition, since faucet joining can increase the contact area of the rotor yoke 31 and the outer end 24 and base end 22 of the rotor attachment member 20, the load acting on the outer end 24 while the rotor 30 is attached can be distributed toward the base end 22.

Arrangement 4. In the outer rotor type motor according to the above embodiment, the cylindrical rotor yoke (31) includes
    a connecting portion (for example, 32 in FIG. 1) formed to overlap the outer end along a vertical direction intersecting the axial direction of the motor shaft, a tubular portion (for example, 34 in FIG. 1) formed so as to arrange the magnets on the inner circumferential surface, and a joint portion (for example, 38 in FIG. 1) configured to join the connecting portion (32) and the tubular portion (34) via a plurality of bending portions (for example, 33, 36 in FIG. 1) that are formed between the connecting portion (32) and the tubular portion (34).

In the outer rotor type motor according to arrangement 4, by providing the plurality of bending portions, it is possible to form a portion between the connecting portion 32 and the tubular portion 34 at an obtuse angle as a gentle bending angle in each bending portion. This can further relax the stress concentration in the rotor yoke 31, as compared with a case in which the portion between the connecting portion 32 and the tubular portion 34 bends at a right angle.

Arrangement 5. The outer rotor type motor according to the above embodiment further comprises a fan (for example, 40 in FIG. 1) formed concentrically with the rotor yoke (31), and the fan (40) is attached to the outer end (24) in a state in which the rotor yoke (31) is attached between the fan (40) and the outer end (24).

Arrangement 6. In the outer rotor type motor according to the above embodiment, a first engaging portion (for example, 29B in FIG. 8) configured to be engaged with a yoke attachment member (for example, 37 in FIG. 7, 8) for attaching the rotor yoke and a second engaging portion (for example, 29A in FIG. 8) configured to be engaged with a fan attachment member (44) for attaching the fan (40) are concentrically formed in the outer end (24).

In the outer rotor type motor according to arrangements 5 and 6, by concentrically attaching the rotor yoke 31 and the fan 40 to the outer end 24 of the rotor attachment member 20, it is unnecessary to additionally provide, in the outer end 24, the fan attachment portion as a structure for attaching the fan 40, thereby making it possible to decrease the size of the outer end 24 (the dimension of the outer end 24 in the radial direction).

Arrangement 7. In the outer rotor type motor according to the above embodiment, a through hole (for example, 39B in FIG. 7) through which the rotor attachment member (37) passes and a through hole (for example, 39A in FIG. 5) through which the fan attachment member (44) passes are concentrically formed in the rotor yoke (31).

In the outer rotor type motor according to arrangement 7, in shape design of the rotor yoke 31, it is unnecessary to consider restrictions of the arrangement and sectional shape of the engaging portion for attaching the fan 40 to the rotor yoke 31. For example, when the fan 40 is attached to the rotor yoke 31, restrictions such as a restriction that a bottom portion needs to be formed by linearly extending the connecting portion 32 of the rotor yoke 31 in consideration of engagement with a fastening member can be imposed on the shape design.

With the structure in which the fan 40 is attached to the outer end 24 of the rotor attachment member 20, it is possible to improve the degree of freedom in the shape design of the rotor yoke 31. For example, it is possible to form the plurality of bending portions 33 and 36 between the connecting portion 32 and the tubular portion 34 like the sectional shape of the rotor yoke 31 shown in FIG. 1. This can form the rotor yoke 31 in a shape that can relax the stress concentration.

Arrangement 8. In the outer rotor type motor according to the above embodiment, the cylindrical rotor yoke (31) includes a connecting portion (for example, 32 in FIG. 1) formed to overlap the outer end along a vertical direction intersecting the axial direction of the motor shaft, a tubular portion (for example, 34 in FIG. 1) formed so as to arrange the magnets on the inner circumferential surface, and a joint portion (for example, 38 in FIG. 1) configured to join the connecting portion (32) and the tubular portion (34) via a plurality of bending portions (for example, 33, 36 in FIG. 1) formed between the connecting portion (32) and the tubular portion (34), and a blade portion (for example, 42 in FIG. 1) of the fan (40) is arranged in a space formed between the fan (40) and the joint portion (38) bending by the plurality of bending portions (33, 36).

Arrangement 9. In the outer rotor type motor according to the above embodiment, the joint portion (38) includes, as the plurality of bending portions, a first bending portion (for example, 36 in FIG. 1) formed to bend the joint portion (38) toward the tubular portion at a first angle between the connecting portion (32) formed in the vertical direction with respect to the axial direction of the motor shaft (10) and the tubular portion (34) formed along the axial direction, and a second bending portion (for example, 33 in FIG. 1) formed to bend, at a second angle, the joint portion (38) bending at the first angle by the first bending portion (36) to be joined to the tubular portion (34).

In the outer rotor type motor according to arrangements 8 and 9, by arranging the blade portion 42 in the space formed when the joint portion 38 bends, the outer rotor type motor with the cooling mechanism (fan) using the rotation driving force of the motor can further be decreased in size.

In addition, when the joint portion 38 bends by the plurality of bending portions 33 and 36, the space where the blade portion 42 can be arranged can be enlarged, and it is possible to decrease the size, and also cool the outer rotor type motor 100 using the fan 40 with a larger area of the blade portion 42 and improved cooling performance.

Arrangement 10. In the outer rotor type motor according to the above embodiment, a notch portion (for example, 47 in FIG. 6) formed not to abut against the yoke attachment member (37) for attaching the rotor yoke (31) to the outer end (24) is formed in the fan (40).

In the outer rotor type motor according to arrangement 10, while maintaining the state in which the rotor yoke 31 (rotor 30) is attached to the outer end 24 of the rotor attachment member 20, it is possible to detach only the fan 40 from the outer end 24 of the rotor attachment member 20. This can improve the maintainability of the outer rotor type motor.

Arrangement 11. In the outer rotor type motor according to the above embodiment, when a distance from a center of the motor shaft to a central portion of the outer end in the radial direction is set as a first distance, and a distance from the center of the motor shaft to an outer peripheral portion of the rotor yoke is set as a second distance, the outer end is attached at a position where a relation of the first distance>0.5×the second distance is satisfied.

In the outer rotor type motor according to arrangement 11, by forming the outer end 24 attached with the rotor 30 at a position (the first distance>0.5×the second distance) close to the inner circumferential surface of the cylindrical rotor yoke 31, as compared with the outer peripheral surface of the motor shaft 10, it is possible to reduce the influence of the centrifugal force (load) that can be generated by the rotation of the rotor 30, thereby providing the outer rotor type motor excellent in strength reliability.

The present invention is not limited to the above embodiments and various changes and modifications can be made within the spirit and scope of the present invention. Therefore, to apprise the public of the scope of the present invention, the following claims are made.

What is claimed is:

1. An outer rotor type motor including a rotor in which magnets are arranged on an inner circumferential surface of a cylindrical rotor yoke and a stator disposed on an inner peripheral side of the rotor yoke, comprising:
a motor shaft configured to rotate integrally with the rotor;
a rotor attachment member including a base end extended from an outer periphery of the motor shaft outward in a radial direction and an outer end formed from an outer periphery of the base end outward in the radial direction, wherein the rotor yoke is installed at the outer end of the rotor attachment member;
a first fan and a second fan configured to rotate integrally with the rotor; and
a motor housing configured to accommodate the rotor and the stator,
wherein the first fan is fixed to the rotor attachment member so as to rotate integrally with the motor shaft and is arranged inside the motor housing and is configured to circulate air inside the motor housing, and
the second fan is fixed to the motor shaft so as to rotate integrally with the motor shaft and is arranged outside the motor housing, and is arranged inside a motor cover attached to the outside of the motor housing and is configured to circulate air inside the motor cover.

2. The outer rotor type motor according to claim 1, wherein the base end is formed so that a thickness in an axial direction of the motor shaft gradually decreases from the outer periphery of the motor shaft to the outer end that is radially outside.

3. The outer rotor type motor according to claim 1, wherein
a step is formed between the base end and the outer end along the axial direction of the motor shaft, and
the rotor is attached to the outer end in a state in which an opening of the rotor yoke is fitted in the step.

4. The outer rotor type motor according to claim 1, wherein a first engaging portion configured to be engaged with a yoke attachment member for attaching the rotor yoke and a second engaging portion configured to be engaged with a fan attachment member for attaching the first fan are concentrically formed in the outer end.

5. The outer rotor type motor according to claim 4, wherein a through hole through which a yoke attachment member passes and a through hole through which the fan attachment member passes are concentrically formed in the rotor yoke.

6. The outer rotor type motor according to claim 1, wherein a notch portion, formed not to abut against a yoke attachment member for attaching the rotor yoke to the outer end, is formed in the first fan.

7. The outer rotor type motor according to claim 1, wherein when a distance from a center of the motor shaft to a central portion of the outer end in the radial direction is set as a first distance, and a distance from the center of the motor shaft to an outer peripheral portion of the rotor yoke is set as a second distance, the outer end is formed at a position where a relation of the first distance>0.5×the second distance is satisfied.

8. The outer rotor type motor according to claim 1, wherein the second fan is attached by a fastening member to an end portion of the motor shaft that is axially different from a position of the outer end of the motor shaft.

9. The outer rotor type motor according to claim 1, wherein
the first fan includes:
a body formed in a planar and annular shape; and
a plurality of blades protruded from the body and formed in a circumferential direction of the body,
the rotor yoke is formed with bending portions that are bent in a direction apart from the body of the first fan, in a state in which the first fan is attached to the outer end, and
the plurality of blades are extended toward the bending portions in a space formed between the bending portions and the body.

10. The outer rotor type motor according to claim 1, wherein the outer end is formed at a position closer to the inner circumferential surface of the rotor yoke, than an outer peripheral surface of the motor shaft,
the rotor yoke and the first fan are attached to the outer end by a fan attachment member, and the second fan is attached to an end portion of the motor shaft that is axially different from a position of the outer end of the motor shaft, and
the rotor is attached to the outer end.

11. The outer rotor type motor according to claim 1, wherein the cylindrical rotor yoke includes:
a connecting portion formed to overlap the outer end along the radial direction of the motor shaft,
a tubular portion formed so as to arrange the magnets on the inner circumferential surface,
a joint portion configured to join the connecting portion and the tubular portion via a plurality of bending portions formed between the connecting portion and the tubular portion, and
a blade portion of the first fan is arranged in a space formed between the first fan and the bending portions of the joint portion,
wherein an outer diameter of the second fan is smaller than an outer diameter of the first fan.

12. The outer rotor type motor according to claim 11, wherein the joint portion includes, as the plurality of bending portions,
a first bending portion formed by bending the joint portion toward the tubular portion at a predetermined first angle formed between the connecting portion formed in the radial direction with respect to the axial direction of the motor shaft and the tubular portion formed along the axial direction, and
a second bending portion formed by bending, at a predetermined second angle, the joint portion bent at the first angle and the tubular portion formed along the axial direction.

13. The outer rotor type motor according to claim 1, wherein the motor shaft is rotatably supported by bearings provided in the motor housing,
the first fan is attached between the bearings, and
the second fan is attached outside the bearings.

14. The outer rotor type motor according to claim 1, wherein the first fan is attached to the outer end of the rotor attachment member in a state in which the rotor yoke is attached between the first fan and the outer end of the rotor attachment member.

15. The outer rotor type motor according to claim 1,
wherein the first fan circulates air inside the motor housing to cool the rotor and the stator, and
the second fan blows the air taken from an intake opening formed in the motor cover to an outer wall of the motor to cool the outer wall of the motor.

* * * * *